United States Patent
Saban

(10) Patent No.: US 8,577,766 B2
(45) Date of Patent: Nov. 5, 2013

(54) SECURE TRANSACTIONS USING NON-SECURE COMMUNICATIONS

(75) Inventor: Benny Saban, Haifa (IL)

(73) Assignee: Trivnet Ltd., Netanya (IL)

( * ) Notice: Subject to any disclaimer, the term of this patent is extended or adjusted under 35 U.S.C. 154(b) by 319 days.

(21) Appl. No.: 12/750,717

(22) Filed: Mar. 31, 2010

(65) Prior Publication Data
US 2010/0257097 A1 Oct. 7, 2010

Related U.S. Application Data

(60) Provisional application No. 61/165,525, filed on Apr. 1, 2009.

(51) Int. Cl.
*G06Q 40/00* (2012.01)
*H04M 3/16* (2006.01)

(52) U.S. Cl.
USPC .......................... 705/35; 455/410

(58) Field of Classification Search
USPC .......................... 705/35; 455/410
See application file for complete search history.

(56) References Cited

U.S. PATENT DOCUMENTS

2003/0126259 A1 * 7/2003 Yoshida et al. ............... 709/225
2007/0037552 A1 2/2007 Lee et al.

* cited by examiner

*Primary Examiner* — Daniel Felten
(74) *Attorney, Agent, or Firm* — Soroker-Agmon

(57) ABSTRACT

A method of performing a secure transaction using non-secure communications, including: contacting a service provider by a customer to perform a transaction; sending an non-secure message by the service provider over a communication network using a communication device with details of the transaction to a transaction server; initiating a secure transaction at the transaction server; generating two one-time passwords at the transaction server; sending the first one-time password to a communication device of the customer and sending the second one-time password to the service providers communication device; revealing the first one-time password to the service provider by the customer; replying to the transaction server by the service provider with a message based on both one-time passwords; completing the transaction at the transaction server.

14 Claims, 4 Drawing Sheets

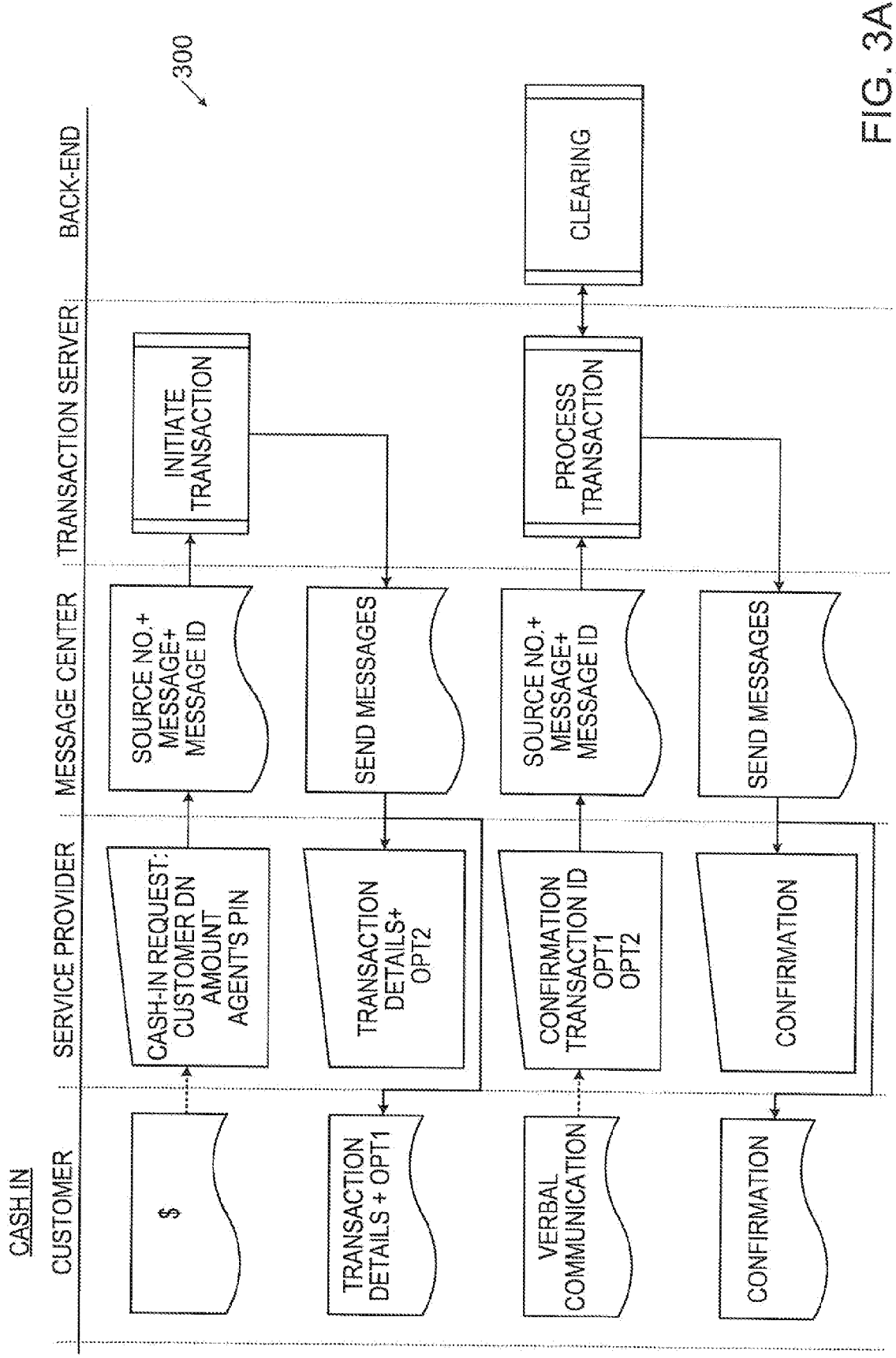

US 8,577,766 B2

SECURE TRANSACTIONS USING NON-SECURE COMMUNICATIONS

FIELD OF THE INVENTION

The present invention relates generally to performing secure monetary transactions using non-secure communications.

BACKGROUND OF THE INVENTION

In the past to perform a monetary transaction a customer needed to transfer a physical monetary item to a service provider, such as gold, coins, paper money or a debit note (e.g. a check). The service provider could deliver the physical monetary item to his bank to convert the monetary item and credit his account. In modern times such a transaction can be performed immediately over communication lines. In some cases a standard computer can be used with special programs that require passwords or other details for authentication and that encrypt the details that are transmitted (e.g. credit card or bank details), so that if the message is intercepted the details cannot be stolen. Many service providers use special equipment, for example a credit card reader that transmits transaction details in an encrypted form.

One form of storing and transferring money that is commonly used in some countries is carried out by having a mobile telephone supplier serve as the bank. A user can prepay the mobile telephone supplier to credit his account and then use the credit to withdraw funds at a physical kiosk or to pay for goods or services from a service provider. Such transactions require that the kiosk or service provider have a secure connection with the mobile telephone supplier to prevent compromising the customer's details.

Various non secure communications methods are supported by mobile telephone suppliers, for example SMS, MMS for standard mobile telephones and immediate messages (IM), Tweeter and web access are offered on more advanced mobile telephones. The use of these communication methods in monetary transactions is problematic since their protocols are insecure, allowing messages to be compromised in different ways, for example by being monitored, intercepted, forwarded, copied, replaced etc. therefore in spite their popularity these communication methods are not used to perform secure transactions.

SUMMARY OF THE INVENTION

An aspect of an embodiment of the invention, relates to a system and method of using non-secure data communications to form a secure monetary transaction. In an exemplary embodiment of the invention, a customer contacts a service provider either physically or virtually over a communication link, which may be either secure or non-secure. The customer provides the service provider with his device number that serves as his ID, and requests to perform a monetary transaction such as depositing money into his/her account, withdrawing funds from the account, or paying for a service. The service provider notifies a transaction server of the desired transaction. The transaction server generates two one time passwords and sends one to the mobile telephone of the customer as previously provided by the customer and one to the service provider. In an exemplary embodiment of the invention, the customer reveals his one time password to the service provider to allow the transaction to proceed. The service provider sends a message based on the two one time passwords to the transaction server to confirm that the original customer is aware of the transaction and confirms it.

In an exemplary embodiment of the invention, the transaction may be that the customer physically meets the service provider and delivers to him cash or other monetary means, or receives from him cash or other items of value. Alternatively, the transaction may be the result of a virtual meeting, for example by providing the service provider with the customers credit card details over the telephone or over a communication link (e.g. the Internet). Optionally, the above process verifies that the real customer that is in possession of a mobile communication device as originally provided by the customer will be aware of and confirm the transaction, thus forming a secure transaction although all notifications may be performed using non-secure communications.

There is thus provided according to an exemplary embodiment of the invention, a method of performing a secure transaction using non-secure communications, comprising:

contacting a service provider by a customer to perform a transaction;

sending an non-secure message by the service provider over a communication network using a communication device with details of the transaction to a transaction server;

initiating a secure transaction at the transaction server;

generating two one-time passwords at the transaction server;

sending the first one-time password to a communication device of the customer and sending the second one-time password to the service providers communication device;

revealing the first one-time password to the service provider by the customer;

replying to the transaction server by the service provider with a message based on both one-time passwords;

completing the transaction at the transaction server.

In an exemplary embodiment of the invention, the method further includes notifying the customer and service provider upon completion of the transaction. Optionally, the service provider's communication device is a mobile device. Alternatively, the service provider's communication device is a non-mobile device. In an exemplary embodiment of the invention, the service provider's communication device includes a biometric reader. Optionally, the customer's communication device is a mobile device. Alternatively, the customer's communication device is a non-mobile device. In an exemplary embodiment of the invention, the messages to the transaction server and from the transaction server are transmitted via a message server. Optionally, the type of non-secure message is selected from the group consisting of: an SMS message, an MMS message, an instant message, an email message and a twitter message. In an exemplary embodiment of the invention, the secure transaction is selected from the group consisting of: loading money into an account; withdrawing money from an account; loading money to another person's account; paying for an item or service; and paying for an online service. Optionally, the customer physically meets the service provider to perform the transaction. In an exemplary embodiment of the invention, the customer contacts said service provider over a secure communication link. Optionally, the details of the transaction include one or more or the following details:

a. the customer's device no;
b. an identification of the customer;
c. an identification of the service provider; and
d. verification of the service provider in the form of a password or biometric information.

There is further provided according to an exemplary embodiment of the invention, a system for performing a secure transaction between a customer and a service provider using non-secure communications, comprising:

a transaction server that is connected to a communications network;

a communication device that is associated with the customer performing the transaction and adapted to communicate with said transaction server over the network;

a communication device associated with the service provider and adapted to communicate with said transaction server over the network;

wherein the transaction server is adapted to receive a non-secure message from the service provider requesting initiation of secure transaction, and wherein the transaction server is adapted to generate two one-time passwords and send the first one-time password to the mobile device of the customer and send the second one-time password to the service providers device; and wherein the transaction server is programmed to complete the transaction upon receiving a reply from the service providers device containing a message that is based on both one-time passwords showing that the customer revealed his one time password to the service provider.

BRIEF DESCRIPTION OF THE DRAWINGS

The present invention will be understood and better appreciated from the following detailed description taken in conjunction with the drawings. Identical structures, elements or parts, which appear in more than one figure, are generally labeled with the same or similar number in all the figures in which they appear, wherein:

FIG. 3A is a chart that illustrates the participant and flow of a process of depositing cash, according to an exemplary embodiment of the invention.

DETAILED DESCRIPTION

Figure 1:
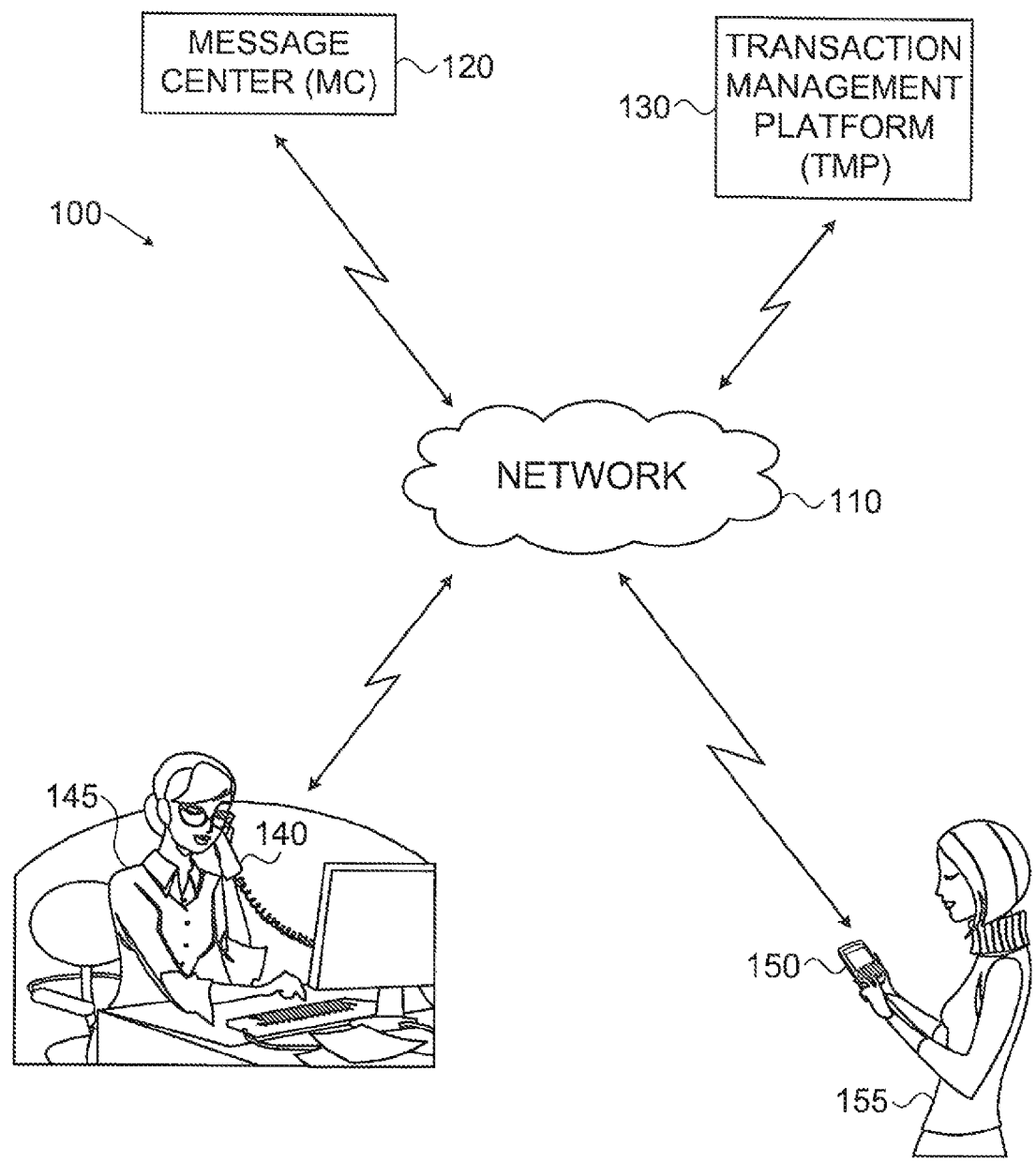
FIG. 1 is a schematic illustration of the participants in a monetary transaction using non-secure communication methods, according to an exemplary embodiment of the invention.

FIG. 1 is a schematic illustration of the participants 100 in a secure monetary transaction using non-secure communication methods, according to an exemplary embodiment of the invention.

Various types of transactions are available between a customer and service provider, for example:

1. Loading money into an account, for example by prepaying a mobile service provider to increase or establish credit;

2. Withdrawing money from an account, for example withdrawing money by reducing available credit at the mobile service provider or bank;

3. Loading money to another persons account;

4. Receiving money from another person;

5. Purchasing merchandise or paying for a service using funds in the persons account;

6. Paying for an online service using funds in the persons account.

In an exemplary embodiment of the invention, the participants include:

1. A transaction management platform (TMP) 130 that serves as a transaction server accepting instructions from customers and service providers to record and instruct a back end server to perform monetary transactions for a bank, a mobile service provider, or other transaction entity. Optionally, transaction management platform 130 defines the flow of the transaction and manages its progress. In an exemplary embodiment of the invention, transaction management platform 130 is a general purpose computer with appropriate software to perform its function or it may be a tailor designed hardware machine with the appropriate software.

2. A messaging center (MC) 120 that is capable of sending messages (e.g. SMS messages, instant messages (IM)) to mobile devices and receiving messages from mobile devices. Optionally, the messaging center 120 is capable of accepting a message from one communication device and transmitting it to another communication device, for example from a mobile telephone to a computer, from standard telephones to mobile telephones and vice versa. Additionally, the messaging center may support the conversion of messages when transmitting from one device to another, for example accepting an SMS message and transmitting it as an email message or vice versa. In an exemplary embodiment of the invention, messaging center 120 transfers each message handled also to the transaction management platform 130, so that it may act on the messages if an action is required. In an exemplary embodiment of the invention, messaging center 120 is implemented using a general purpose computer with appropriate software or a dedicated hardware machine with appropriate software.

3. A customer 155 that is interested in performing a secure transaction, for example performing a monetary action with a service provider. Customer 155 is the provider or receiver of the money to be used in the transaction and is in possession of a mobile communication device 150 (e.g. a mobile telephone capable of sending and receiving data messages such as SMS messages).

In an exemplary embodiment of the invention, customer 155 may be identified by the service provider with two factors that are pre-recorded at the transaction management platform 130:

I. A device number (DN), for example the customer's cellular telephone number or the MAC and IP address of an IP device or other device identifier's that may be used to identify communications from the device and/or routing communications to the device. Optionally, the device number may be exposed explicitly in a message or implicitly from details of the communication protocol.

II. A personal ID, for example the customer's passport or driver's license.

4. A service provider 145 that may provide a service to customer 155 directly in return for payment (e.g. a store selling merchandise), or wherein the service provider 145 may serve as an agent for a company that provides monetary services for customer 155. Optionally, customer 155 contacts the service provider 145 virtually or physically to deliver a monetary item that will be credited to the customer's account.

5. A mobile or non-mobile communication device 150 belonging to customer 155, for example a mobile telephone, a standard telephone, a laptop computer, or a desktop computer that is capable of sending and receiving non-secure data messages such as SMS messages and/or email messages.

6. A mobile or non-mobile communication device 140 belonging to the service provider, for example a mobile telephone, a standard telephone, a laptop computer, or a desktop computer connected to a communication line. Optionally, the service provider's communication device 140 includes a biometric reader such as a fingerprint reader so that transaction management platform 130 may verify the identity of service provider 145.

In an exemplary embodiment of the invention, the participants communicate with each other over a network 110. Optionally, network 110 may represent multiple networks, wherein each pair of participants may communicate with each other over a different type of network depending on their communication device, for example a LAN, a WAN (e.g. the Internet), a PSTN network, a mobile telephone network, WiFi or any other type of communication network or medium.

Figure 2:
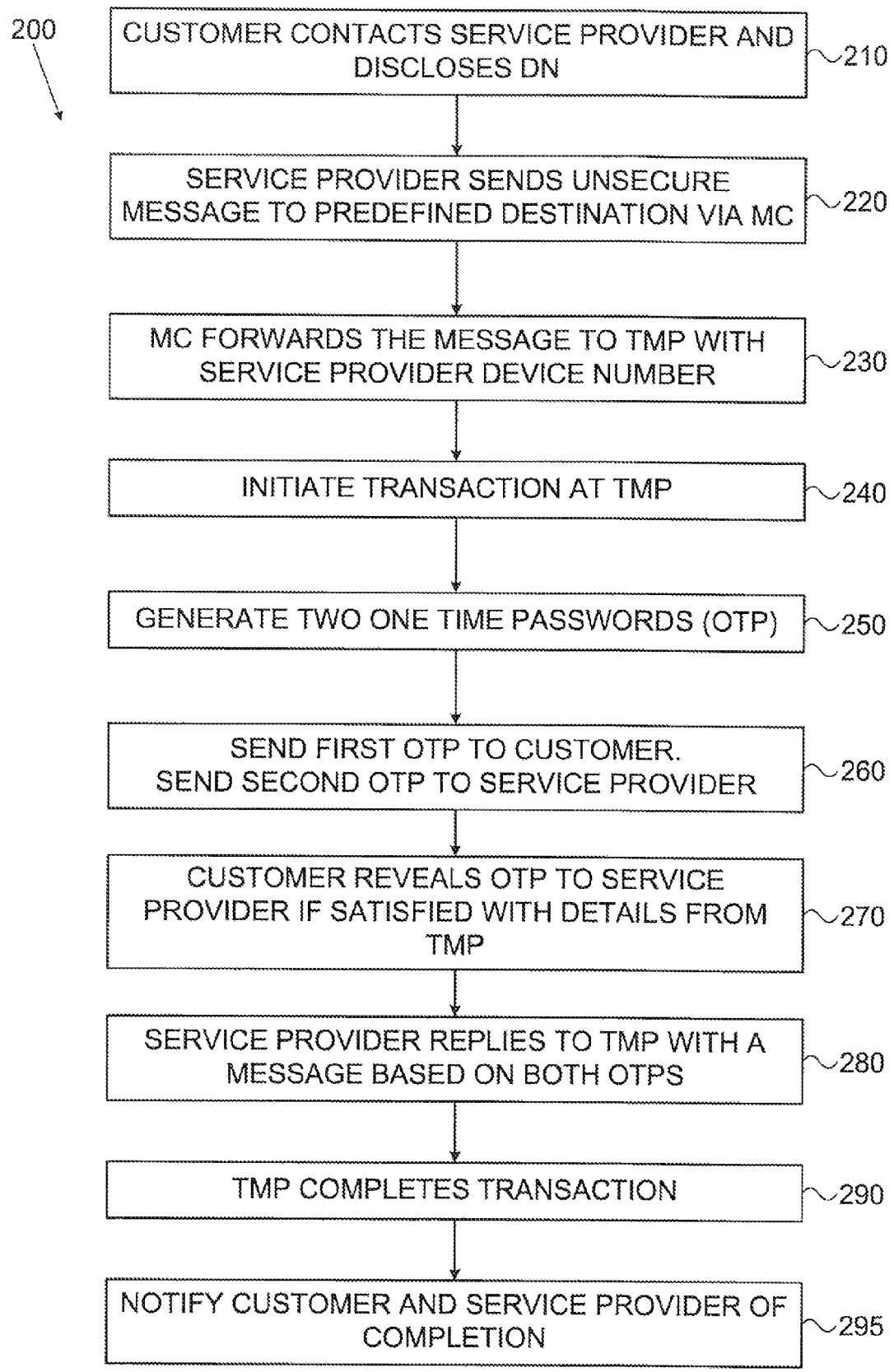
FIG. 2 is a flow diagram of a method of performing a secure transaction, according to an exemplary embodiment of the invention.

FIG. 2 is a flow diagram of a method 200 of performing a secure transaction, according to an exemplary embodiment of the invention. In an exemplary embodiment of the invention, method 200 enables customer 155 to perform a secure monetary transaction with service provider 145, wherein security of the transaction will be achieved by using a non-secure communication protocol, such as SMS, MMS, twitter, instant messaging (IM) or email to transmit messages.

In an exemplary embodiment of the invention, customer 155 contacts (210) service provider 145 and discloses his/her device number. Optionally, the contact may be by physically meeting to transfer a monetary item. Alternatively, the contact may be by telephone, for example using a credit card. Further alternatively the contact may be by virtually meeting, for example by communicating over a secure communication link over the Internet.

In an exemplary embodiment of the invention, the contact may be to perform any of the transactions listed above, for example to add money to a virtual account (e.g. at a mobile telephone supplier) or withdraw money from a virtual account. Optionally the service provider 145 sends (220) a non-secure message to messaging center 120 to forward the message to a predefined destination. Optionally, the predefined destination is the address of a device belonging to transaction management platform 130 or is a short code that is recognized by messaging center 120. In an exemplary embodiment of the invention, the message includes the customers device number (e.g. mobile telephone number), details of the transaction (e.g. amount of money being provided or withdrawn), type of action to be taken (e.g. debit client and credit service provider or credit client and debit service provider), and verification of the service provider's identity (e.g. a password or using a biometric device integrated into the service provider's device, such as a fingerprint reader). In an exemplary embodiment of the invention, messaging center 120 identifies the service provider's device number and forwards (230) the message to transaction management platform 130, based on the predefined destination provided by the service provider.

In an exemplary embodiment of the invention, transaction management platform 130 initiates (240) a transaction. Optionally, transaction management. platform 130 generates (250) two one time passwords: OTP1 and OTP2 (sometimes referred to as temporary access numbers). Optionally, an OTP is a pseudo-random sequence of digits and/or letters and/or symbols who's value is hard to predict. In an exemplary embodiment of the invention, transaction management platform 130 sends (260) messages with the details of the transactions and the two OTPs to messaging center 120 to send the details and OTP1 to customer 155 and the details and OTP2 to service provider 145.

In an exemplary embodiment of the invention, customer 155 receives the message with OTP1 and reveals (270) it to service provider 145 if he/she is satisfied with the details and wants to complete the transaction. Optionally, service provider 145 replies (280) to the OTP2 message from transaction management platform 130 with a message including both OTP1 and OTP2 or a combination resulting from both.

Optionally, upon receiving both OTPs from service provider 145, transaction management platform 130 completes (290) the transaction, for example by crediting the customer's account so that a monetary item provided by the customer is immediately recorded in the customers account.

In some embodiments of the invention, transaction management platform 130 confirms (295) performance of the transaction by sending a notification to the customer 155 and service provider 145. Optionally, the customer or service provider may contest the transaction by responding to the confirmation message.

In an exemplary embodiment of the invention, service provider 145 may have two device numbers (DN) for two different devices or for the same device. Optionally, service provider 145 may use one to initially notify transaction management platform 130 of the transaction, and the second one to receive OTP2. The use of two DNs enhances the level of security by requiring a hacker to concurrently impersonate two DNs to overcome system security.

Optionally, if a service provider's device is lost or stolen it cannot be used to perform transactions without providing verification of the service provider's identity as described above (e.g. a password or biometric parameter). In an exemplary embodiment of the invention, multiple false attempts to authenticate will cause a device and/or service provider account to be locked until proper action is taken to verify that the service provider 145 is in control of the transaction process.

In an exemplary embodiment of the invention, a customer that loses their device may have their account locked until they associate their account with a new device.

In some embodiments of the invention, multiple customer DNs may be associated with a single virtual account, so that one of a group of user's may manipulate the account, for example to deposit money or to withdraw money.

Figure 3B:
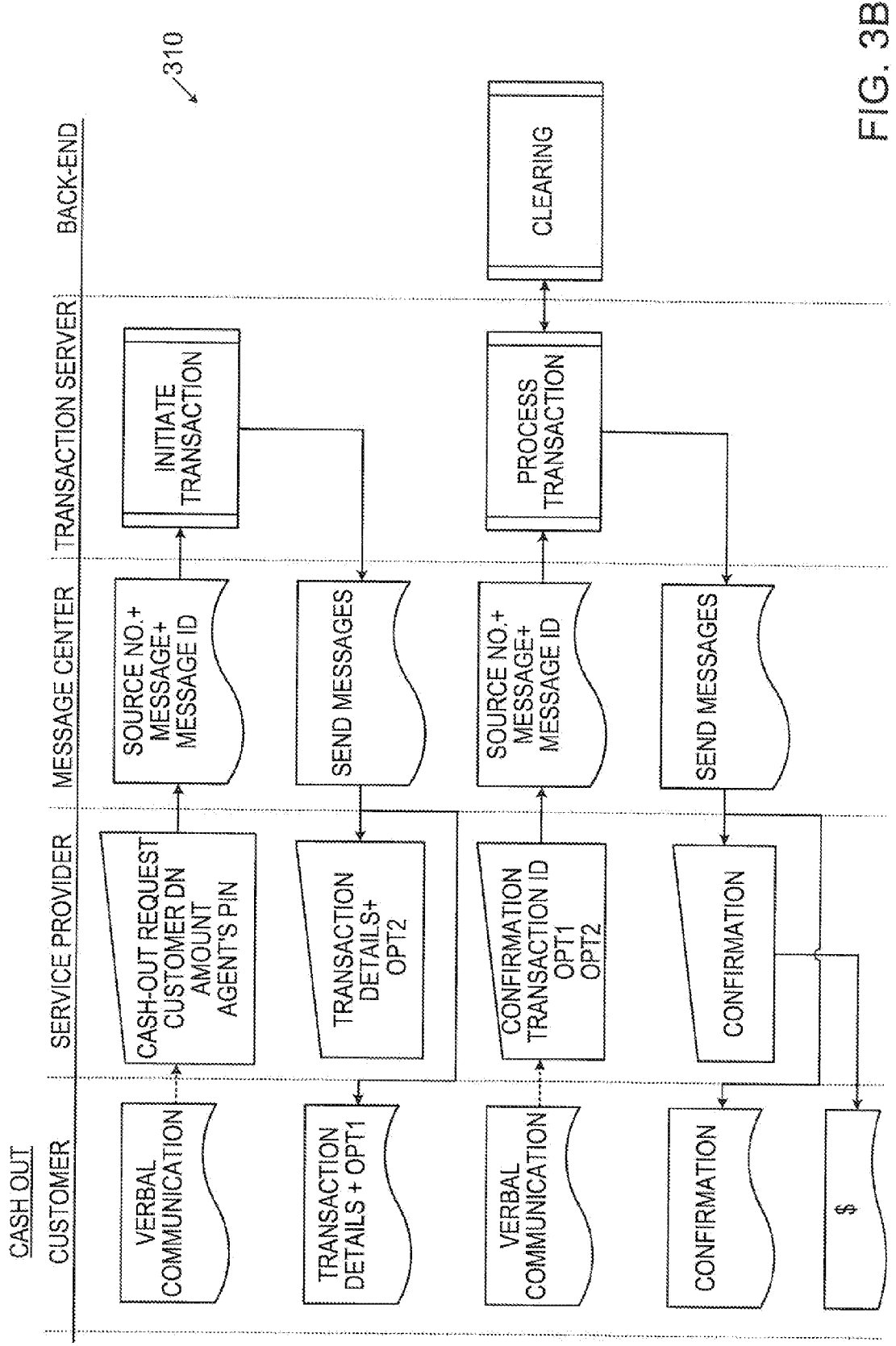
FIG. 3B is a chart that illustrates the participant and flow of a process of withdrawing cash, according to an exemplary embodiment of the invention.

FIG. 3A is a chart 300 that illustrates the participant and flow of a process of depositing cash, and FIG. 3B is a chart 310 that illustrates the participant and flow of a process of withdrawing cash, according to an exemplary embodiment of the invention.

In charts 300 and 310 the participants performing the actions are listed on the top of each column with the flow of actions performed by them listed below in the respective column, according to the description of method 200 as described above.

It should be appreciated that the above described methods and apparatus may be varied in many ways, including omitting or adding steps, changing the order of steps and the type of devices used. It should be appreciated that different features may be combined in different ways. In particular, not all the features shown above in a particular embodiment are necessary in every embodiment of the invention. Further combinations of the above features are also considered to be within the scope of some embodiments of the invention.

It will be appreciated by persons skilled in the art that the present invention is not limited to what has been particularly shown and described hereinabove. Rather the scope of the present invention is defined only by the claims, which follow.

The invention claimed is:

1. A method of performing a secure transaction using non-secure communications, comprising:
   contacting a service provider by a customer to perform a transaction; wherein said contacting is performed either physically or virtually over a communication link using a communication device of the customer;

sending a non-secure message by the service provider over a communication network using a communication device with details of the transaction to a transaction server;

initiating a secure transaction at the transaction server;

generating two one-time passwords at the transaction server;

sending the first one-time password to the communication device of the customer and sending the second one-time password to the service provider's communication device;

revealing the first one-time password to the service provider by the customer from the communication device of the customer;

replying to the transaction server by the service provider with a message based on both one-time passwords;

completing the transaction at the transaction server.

2. A method according to claim 1, further comprising notifying the customer and service provider upon completion of the transaction.

3. A method according to claim 1, wherein said service provider's communication device is a mobile device.

4. A method according to claim 1, wherein said service provider's communication device is a non-mobile device.

5. A method according to claim 1, wherein said service provider's communication device includes a biometric reader.

6. A method according to claim 1, wherein said customer's communication device is a mobile device.

7. A method according to claim 1, wherein said customer's communication device is a non-mobile device.

8. A method according to claim 1, wherein the messages to the transaction server and from the transaction server are transmitted via a message server.

9. A method according to claim 1, wherein said non-secure message is selected from the group consisting of: an SMS message, an MMS message, an instant message, an email message and a twitter message.

10. A method according to claim 1, wherein said secure transaction is selected from the group consisting of: loading money into an account; withdrawing money from an account; loading money to another person's account; paying for an item or service; and paying for an online service.

11. A method according to claim 1, wherein said customer physically meets the service provider to perform the transaction.

12. A method according to claim 1, wherein said customer contacts said service provider over a secure communication link.

13. A method according to claim 1, wherein the details of the transaction include one or more or the following details:
   a. the customer's device no;
   b. an identification of the customer;
   c. an identification of the service provider; and
   d. verification of the service provider in the form of a password or biometric information.

14. A system for performing a secure transaction between a customer and a service provider using non-secure communications, comprising:
   a transaction server that is connected to a communications network;
   a communication device that is associated with the customer performing the transaction and adapted to communicate with said transaction server over the network;
   a communication device associated with the service provider and adapted to communicate with said transaction server over the network;
   wherein the transaction server is adapted to receive a non-secure message from the service provider requesting initiation of secure transaction, and wherein the transaction server is adapted to generate two one-time passwords and send the first one-time password to the mobile device of the customer and send the second one-time password to the service provider's device; and wherein the transaction server is programmed to complete the transaction upon receiving a reply from the service provider's device containing a message that is based on both one-time passwords showing that the customer revealed his one time password to the service provider.

* * * * *